July 4, 1961  W. W. BUNTING, JR., ET AL  2,990,671
MULTIPLE VORTEX PNEUMATIC TWISTER AND METHOD
OF PRODUCING ALTERNATE TWIST YARN
Filed March 17, 1959  3 Sheets-Sheet 1

INVENTORS
WILLIAM WALLAR BUNTING, JR.
LORENZO CENZATO

BY Raymond E. Blomstedt
ATTORNEY

July 4, 1961 W. W. BUNTING, JR., ET AL 2,990,671
MULTIPLE VORTEX PNEUMATIC TWISTER AND METHOD
OF PRODUCING ALTERNATE TWIST YARN
Filed March 17, 1959 3 Sheets-Sheet 2
*Fig. 7*
*Fig. 8*
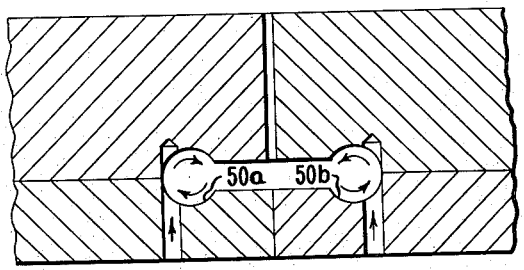
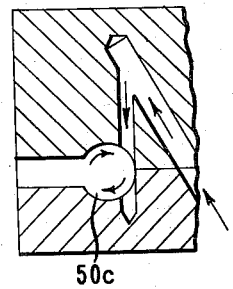
*Fig. 9*    *Fig. 10a*    *Fig. 10b*
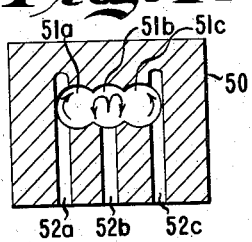
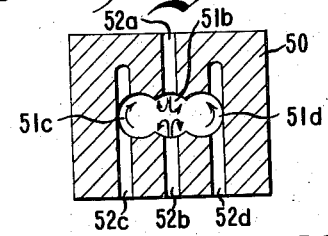
*Fig. 11*      *Fig. 12*
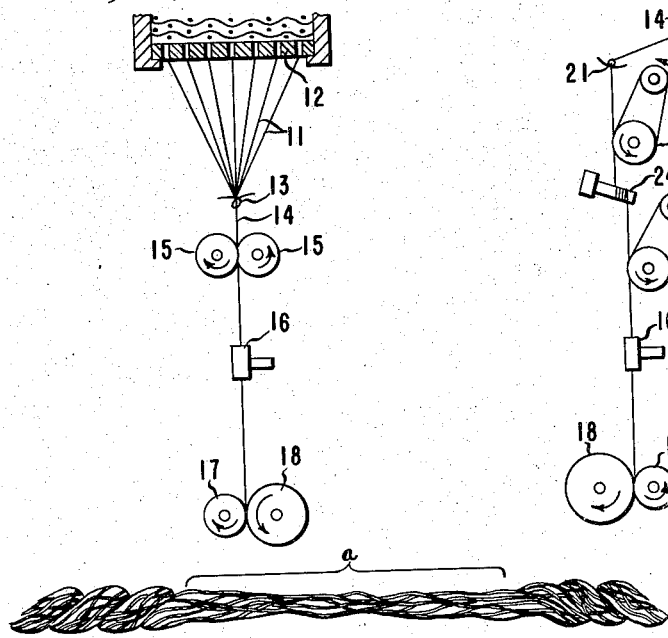
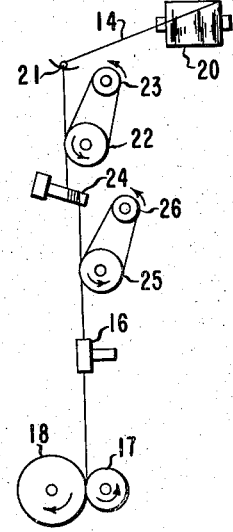
*Fig. 19*
INVENTORS
WILLIAM WALLAR BUNTING, JR.
LORENZO CENZATO
BY Raymond E. Bluestone
ATTORNEY July 4, 1961 W. W. BUNTING, JR., ET AL 2,990,671
MULTIPLE VORTEX PNEUMATIC TWISTER AND METHOD
OF PRODUCING ALTERNATE TWIST YARN
Filed March 17, 1959 3 Sheets-Sheet 3
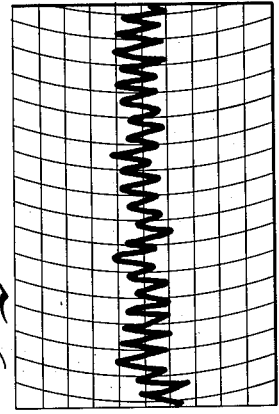
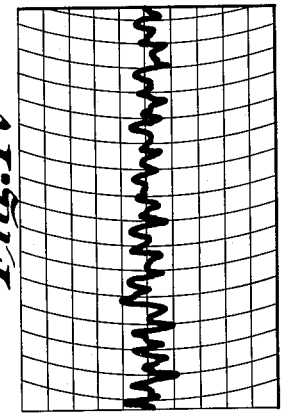
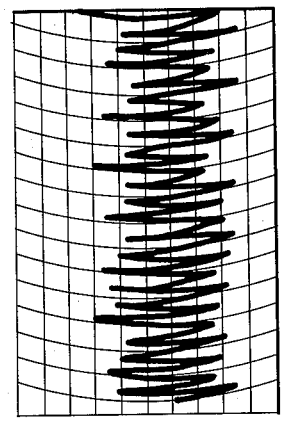
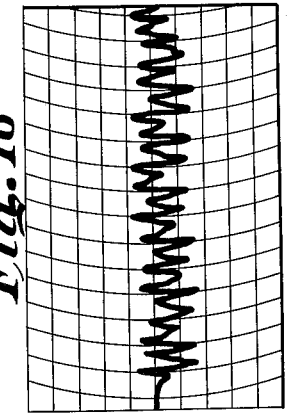
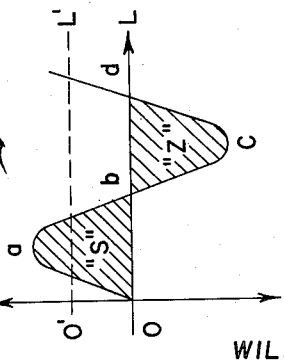
INVENTORS
WILLIAM WALLAR BUNTING, JR.
LORENZO CENZATO
BY Raymond E. Blomstedt
ATTORNEY

United States Patent Office 2,990,671
Patented July 4, 1961

2,990,671
MULTIPLE VORTEX PNEUMATIC TWISTER AND METHOD OF PRODUCING ALTERNATE TWIST YARN
William Wallar Bunting, Jr., and Lorenzo Cenzato, Wilmington, Del., assignors to E. I. du Pont de Nemours and Company, Wilmington, Del., a corporation of Delaware
Filed Mar. 17, 1959, Ser. No. 800,040
16 Claims. (Cl. 57—34)

This invention relates to yarn production and handling, and is particularly concerned with twisting as-spun or zero-twist yarn in a continuous manner. More specifically, this invention relates to an improved process and apparatus for continuously twisting such yarn, and to alternating-twist products produced thereby.

The preparation and characterization of stable alternating-twist yarns in which individual filaments within the yarn bundle possess random twist is disclosed in patent application Serial No. 754,912 filed August 12, 1958, by Breen and Sussman. Such a yarn is prepared by pneumatic twisting with systematic variation in the rate of twisting which, according to preferred embodiments of that invention may be accomplished by intermittent unidirectional twisting or by alternately twisting in opposite directions, the appropriate twister being employed in combination with suitable valve means so as to provide intermittency or alternation, respectively, of the fluid flow in the twister. An alternating-twist yarn also may be prepared during continuous unidirectional twisting by systematically varying the tension in the yarn, due to the dependence of the rate of pneumatic twisting on the yarn tension. This method thus obviates the need for auxiliary valves. However, the susceptibility of pneumatic twisting to varying yarn tension may lead to difficulties when twisting according to the first-mentioned procedures since cyclical variations in tension, e.g., as encountered with conventional reciprocating traverse windups, may cause secondary variations in twist level to be superimposed on the desired twist profile of the product. Where the twist profile along the length of the yarn is irregular, unsightly streaks and the like may appear in the final fabric. Obviously, it is preferred that alternating-twist yarns be prepared with uniform and/or regular twist profiles. Although the effects of variable tension can, in part, be mechanically damped or even canceled entirely by careful phasing of the twisting and tension cycles, such methods are exceedingly impractical in continuous, high-speed operations.

Accordingly, one object of this invention is to provide a method and apparatus for preparing uniform alternating-twist yarns during pneumatic twisting in alternately opposed directions in a system subject to periodic variations in the yarn tension. Another object is a multiple-vortex pneumatic twister. Still another object is such a twister adapted to operate in combination with means for reciprocating the yarn line, and the method thereof. A further object is an alternating-twist yarn in which the individual filaments are interlaced over the yarn segments having zero bundle twist, i.e., over the twist reversal segments.

In accordance with the instant invention, these and other objects are accomplished by forwarding the yarn through a multiple-vortex pneumatic twister positioned intermediate a feed point and a takeup point, subjecting the yarn to the action of the said twister while simultaneously and systematically traversing the yarn from vortex to vortex within the twister, and thereafter forwarding the yarn to the said takeup point at a tension less than the tension necessary to remove the imparted twist. The yarn traverse means may be positioned up or downstream from the twister, and preferably is a conventional reciprocating traverse located downstream from the twister at the takeup point, e.g., at the package windup. In such a system and at conventional yarn speeds and traverse frequencies, the product is a uniform stable alternating-twist yarn having successive segments of S and Z twist, the net sum of all such twists being substantially zero. Surprisingly, at conventional yarn speeds but at relatively high traverse frequencies, the product is an interlaced yarn, i.e., a compact unitary strand which maintains its unity even at zero bundle twist. Both products are prepared by the process of this invention in a rapid and continuous manner, and may be used in the place of conventional twisted yarn in a wide variety of applications.

In its simplest embodiment, the apparatus of this invention comprises, in combination, a multiple-vortex pneumatic twister, means for forwarding the yarn through the twister, and means for traversing the yarn within the twister. The multiple-vortex pneumatic twister comprises two or more yarn passageways which are smooth concave surfaces in combination with one or more fluid conduits positioned to direct a stream of fluid circumferentially about the inner periphery of each concave surface. Preferably, the longitudinal axes of each yarn passageway are substantially parallel, and the longitudinal axis of each yarn passageway is separated from that of adjacent yarn passageways by a distance less than the mean diameter (where they are cylindrical) of each adjacent pair of yarn passageways, in order to provide lateral communication between each yarn passageway throughout their respective lengths. Optionally, lengthwise slots may be employed to provide such lateral communication. Each yarn passageway may be integral with the fluid conduits, or the latter may be spaced apart from the yarn passageway but in position to direct fluid substantially tangentially to the inner periphery of the curved concave surface at some point. The axes of fluid flow should not intersect the axes of the two laterally extreme yarn passageways, but may lie in a plane substantially perpendicular to the longitudinal axis of each concave surface, or in a plane inclined up to about 75 degrees or more from this perpendicular in order to exert forward movement or braking action upon the yarn in addition to twisting motion. There may be a plurality of conduits directing fluid flow about the periphery of each concave surface, and these conduits may be spaced longitudinally or circumferentially or both about the yarn passageway. Naturally, in order to obtain the highest rate of twisting, all fluid conduits, where there is a plurality, should be directed in substantially the same tangential direction. It is not necessary, however, that the longitudinal axes of all the fluid conduits lie in the same or parallel planes with respect to the axis of a given yarn passageway. One or more of a plurality of fluid conduits may have axes perpendicular to the axis of the yarn passageway while one or more others may have axes inclined to impart forward or twisting motion to the yarn while other fluid conduits may have axes inclined backward along the axis to partially inhibit the passage of the yarn therethrough. In the case where there are a plurality of fluid conduits supplying fluid to a yarn passageway, it may be desirable to provide one or more exhaust ports along that yarn passageway, and these may be positioned at any convenient points.

The product, process, and apparatus of this invention can be more readily understood by referring to the attached drawings, wherein:

FIGURES 1 through 10 show various embodiments of multiple-vortex pneumatic twisters which may be utilized in the present invention. FIGURE 1 is a cross-sectional view of a fluid twister having one fluid conduit. FIGURE 2 is a cross-sectional view of a fluid twister having two fluid conduits and a string-up slot. FIGURE 3 is a prospective view of a fluid twister like that of FIGURE 2. FIGURE 4 is a cross-sectional view of a fluid twister like that of FIGURE 2 but with fluid conduits 52a and 52b offset along the yarn passageway. FIGURE 5 is similar to FIGURE 4 but with the fluid conduits crossed to provide air flow in the yarn passageways in directions opposite to that in FIGURE 4. FIGURE 6 is a cross-sectional view of a fluid twister with four yarn passageways. FIGURE 7 shows a twister with yarn passageways spaced apart and connected by a slot. FIGURE 8 is a cross-sectional view of half a fluid twister. FIGURE 9 is a cross-sectional view of a fluid twister in which the two yarn passageways are semicircular in cross section and communicate with each other through the common diameter. FIGURE 10a is a cross-sectional view of a fluid twister with three yarn passageways and three fluid conduits. FIGURE 10b shows a fluid twister similar to that of FIGURE 10a but with four fluid conduits.

FIGURES 11 and 12 illustrate various apparatus assemblies in which the pneumatic twister of this invention may be utilized to twist or interlace yarn continuously.

FIGURE 13 illustrates a stable alternating-twist yarn of this invention where the yarn bundle in forceably divided.

FIGURES 14–17 are graphs showing the twist profiles of alternating-twist yarns.

FIGURE 18 is a graph showing various characteristics of an alternating-twist yarn.

FIGURE 19 illustrates a complex alternating-twist yarn prepared according to this invention having short sections of interlaced yarn at the reversal points "a."

Figure 1:
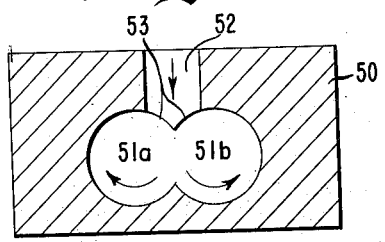

FIGURES 1–2 and 4–10 show cross-sectional views of multiple-vortex pneumatic twisters (hereinafter termed "fluid twisters") taken along the axes of the fluid conduits. Additional examples of fluid twisters which may be used when suitably modified to provide multiple vortices appear as FIGURES 1–31 in U.S. application Serial No. 598,135 filed July 16, 1956, by Breen and Sussman. These figures illustrate the manner of interception of a yarn passageway 51 by one or more fluid conduits 52 and exhaust ports 56 and also show various forms which yarn passageway and fluid conduit may assume. Like numbers appearing in the various figures represent similar structures although the shape or form of the structure may vary from one figure to the next. For example, in each of FIGURES 1 through 10 the yarn passageway is numbered 51. Similarly, the fluid conduit is numbered 52 in each of the figures and so on.

FIGURE 1 shows fluid twister 50 containing axial yarn passageways 51a and 51b, which, in this embodiment, are substantially cylindrical in form throughout their lengths. Fluid conduit 52 intercepts both yarn passageways at 53 and is positioned so that the longitudinal axis of the fluid conduit 52 does not intersect the longitudinal axes of yarn passageways 51a and 51b, rather it intersects both passageways at their line of intersection. When gas under pressure is passed through fluid conduit 52 so that it reaches at least ½ sonic velocity upon emerging into the yarn passageway 51, the force of the gas opens up the yarn and separates the filaments momentarily while simultaneously applying sufficient torque to any yarn in the yarn passageway to produce a high rate of twisting. The path of fluid flow, i.e., vortex formation, is shown by the arrows. At relatively high fluid velocities, less dense fluids can be employed to obtain substantially the same torque produced by a higher density fluid traveling at lower velocity. Fluid may be supplied to the fluid conduit 52 by any convenient means. Preferably, the yarn passageway will have rounded edges at both ends to minimize contact with the yarn bundle. In a preferred embodiment, the fluid twister may be designed to provide for ease in stringing-up a threadline by providing a string-up slot running the entire length of the yarn passageway. The string-up slot may simultaneously serve as an air conduit, if desired. Any of the fluid twisters can be adapted to provide string-up slots.

Figure 2:
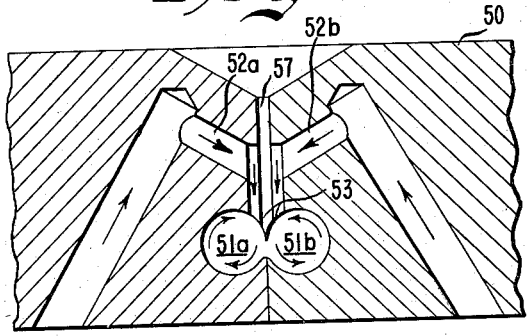

FIGURE 2 shows fluid twister 50 having air-curtained string-up slot 57. Fluid conduits 52a and 52b intersect slot 57 in a downward direction; the convergent fluid stream intersects yarn passageways 51a and 51b at 53.

Figure 4:
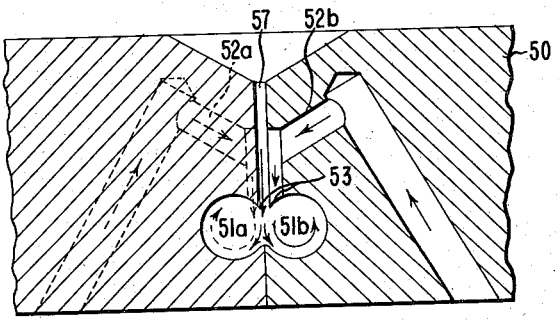

FIGURE 4 shows a fluid twister similar to the one of FIGURE 2 but with fluid conduits 52a and 52b offset with respect to each other.

Figure 5:
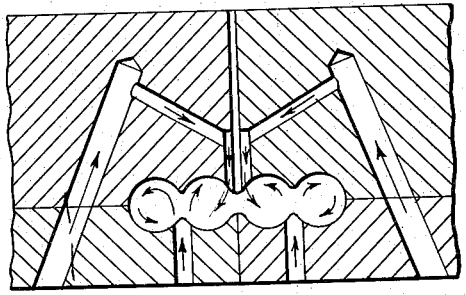

FIGURE 5 is a similar "offset" fluid twister in which fluid conduits 52a and 52b are "crossed" so that the fluid flow in each of yarn passageways 51a and 51b is in a direction opposite to that in the fluid twisters of FIGURES 1, 2, and 4.

Figure 6:
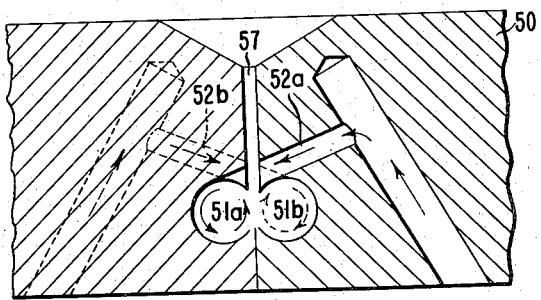

FIGURE 6 shows a fluid twister with four yarn passageways 51a–51d.

The fluid twister of FIGURE 7 has yarn passageways 51a and 51b spaced apart, but interconnected by lengthwise slot 51c.

The half-twister 50c of FIGURE 8 can be used in place of half-twister 50a or 50b of FIGURE 7 to provide fluid flow in the same direction in both yarn passageways.

FIGURE 9 shows an exceptionally simple fluid twister wherein the two fluid vortices exist in a single cylindrical passageway. In the absence of yarn traversing, the fluid twister of FIGURE 9 functions as an interlacer.

FIGURE 10a shows a fluid twister particularly adapted for interlacing yarn at twist reversal points. In this embodiment, intermediate yarn passageway 51b is perpendicularly intercepted by fluid conduit 52b, rather than tangentially, in the case of the laterally extreme yarn passageways 51a and 51c. Thus, the intermediate yarn passageway 51b and fluid conduit 52b are related as the fluid twister of FIGURE 9.

FIGURE 10b shows the twister of FIGURE 10a modified to provide enhanced interlacing, by the addition of fluid conduit 52a which also perpendicularly intercepts yarn passageways 51b, and which has a longitudinal axis in common with fluid conduit 52b.

Figure 3:
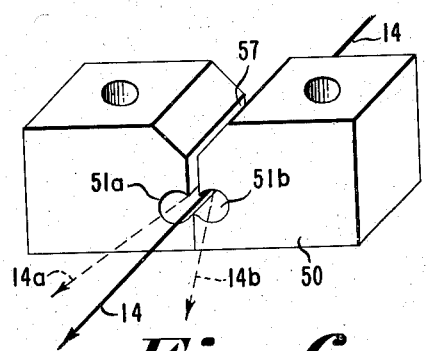

FIGURE 3 is a perspective view of the fluid twister of FIGURE 2 and shows yarn 14 passing therethrough in the direction indicated by the arrowheads. In operation, downstream traversing causes the yarn alternately to be in yarn passageway 51a (position 14a) and in yarn passageway 51b (position 14b). Now, according to FIGURE 2, fluid flows in a clockwise direction in yarn passageway 51a while it flows in a counterclockwise direction in yarn passageway 51b. Thus, yarn 14 in FIGURE 3 is twisted in the S direction upstream and in the Z direction when it is in yarn passageway 51a (position 14a) and conversely, yarn 14 is twisted in the Z direction upstream, the S direction downstream when it is in yarn passageway 51b (position 14b). The same relationship obtains when upstream traversing is utilized; the converse holds when opposite-hand fluid twisters (see FIGURE 5) are employed.

In twisting yarn with a fluid jet, the twister is usually positioned between an upstream feed point, e.g., a set of pinch rolls or other suitable snubbing means, and a downstream takeup point, e.g., a windup package. Yarn is fed continuously from the feed point, through the twister, and thence to the takeup point. When fluid is supplied to the twister, the yarn is twisted in opposite directions, up and downstream from the twister, as indicated hereinabove. Downstream twist is accumulated beyond the takeup point, e.g., on a package, while upstream twist of an equal amount but opposite direction is accumulated between the twister and the feed point. If the yarn remains in a given yarn passageway, the point is rapidly reached where the upstream twist is accumulated to an extent sufficient to counteract the action of the twister, i.e., zero-twist yarn commences to pass through the twister. Mechanically speaking, at this point the upstream twist countertorque becomes equal to the applied torque of the twister. This condition, conveniently termed "equilibrium twisting," usually results in the winding of zero-twist yarn past the takeup point, as in the case of the prior art "false-twisting," or complete breakdown of the yarn line, twist "doubling," etc. However, by virtue of the present invention it becomes possible to avoid such a condition of "equilibrium twisting" by systematically traversing the yarn from vortex to vortex within the twister, the adjacent vortices usually exhibiting opposite-hand fluid flow, especially the two laterally-extreme vortices.

The various factors affecting the pneumatic twisting process are related to the equation $$\frac{S}{L_u}D = \ln \frac{T}{T - t_u S} \quad (1)$$

where S is the yarn speed, $L_u$ the upstream distance from the twister to the first snubbing guide, T is the twisting speed, $t_u$ is the upstream twist level, and D is the duration of twisting, i.e., time interval following the initiation of twisting to the point where $t_u$ is achieved. Since the equilibrium upstream twist level is given by the expression $T/S$, D is chosen so that $t_u$ does not exceed about $0.9T/S$, thereby avoiding a condition of equilibrium twisting and, therefore, permitting production of an alternating-twist yarn having excellent uniformity of twist level and twist period. In the particular application considered herein, D depends on the traverse cycle C, i.e., the time required for one complete traverse stroke and return stroke. Since the yarn is in each of the end yarn passageways for a time of about ½C, it follows that the quantity ½C should be determined to that $t_u$ does not exceed about $0.9T/S$ if a condition of equilibrium twisting is to be avoided. D also is dependent on the ratio $S/L_u$. The practical significance of this relationship is that as the $S/L_u$ ratio increases, i.e, as the yarn speed increases or the upstream distance decreases, the time after initiation of a given twisting cycle required to achieve equilibrium twisting decreases, hence D under such conditions should be correspondingly reduced to avoid the production of zero-twist yarn. Where D exceeds the time required to achieve equilibrium twisting, an alternating-twist yarn is produced containing sections of zero-twist yarn between sections of S and Z twist, respectively. Further details relative to pneumatic twisting in general are contained in patent application Serial No. 754,912 filed August 12, 1958.

Fluid pressure, yarn tension, and traverse cycle frequency are the most important process variables in the practice of the instant invention.

Air at room temperature is preferred for twisting yarn in the fluid jet device of this invention, but the air may be heated or refrigerated, if desired. Low pressure steam may also be used where its plasticizing action, if any, is not harmful. Other gases substantially inert to the yarn, such as carbon dioxide, nitrogen, and the like, may be utilized, if desirable. The invention is illustrated using air as a fluid because air is preferred in carrying out the process of this invention, but any inert fluid is suitable providing its plasticizing action, if any, is less than that of any upstream plasticizing step utilized. Mixtures of fluids also may be utilized. In order to operate the process in accordance with the invention, it is necessary that the fluid, for example, air, immediately prior to imping- ing upon the yarn reach a velocity of ½ sonic velocity or more, so that depending on the diameter of the yarn passageway, twisting speeds of between about 200,000 and about 2,000,000 revolutions per minute are easily obtained. For this purpose, air at a pressure of at least about 10 p.s.i.g. is usually sufficient, with a pressure of 15 p.s.i.g. or more preferred, when operating at normal yarn tensions. Even lower pressures may be employed in those cases where the yarn tension is of a low order. It is preferred that yarn tension be of a low order, and tensions less than about 30 grams are desirable in most applications. Lower tensions, say between about 0.1 and about 15 grams, are preferred, and for the most efficient twisting action at the highest twisting rates and yarn throughput, tension of the yarn should be maintained between about 0.5 and about 10 grams. Tension during twisting should be sufficient to prevent "twist doubling."

As indicated hereinabove, the traverse cycling determines to an appreciable extent the nature of the product of this invention. Equilibrium twisting and hence the production of zero-twist yarn is avoided by proper determination of the traverse cycle. Moreover, at a given twister speed, the traverse cycle determines the level of twist in the yarn as a fraction of the equilibrium twist level and, therefore, affects the average twist level in the product. The "average absolute twist" level is defined as the absolute numerical average of twist per unit length, taken over a representative sample length of yarn (several twist periods), regardless of twist direction. The average level of twist also depends on the yarn tension and fluid pressure, and is inversely and directly proportional respectively to the magnitude of these quantities. At a given yarn speed, the traverse cycle determines the length of yarn over which twist of a given direction is imparted and, therefore, affects the twist period in the product. "Twist period" or cycle length is the distance along the threadline that contains a complete section of both S and Z twist. A length of yarn containing twist in but one direction (S or Z) is described as the "increment length" of twist. Finally, the traverse cycle frequency will determine the gross characteristics of the product. At relatively low traverse frequencies, say less than about 25 cycles per second (c.p.s.), the product is an alternating-twist yarn which exhibits excellent uniformity of twist level and periodicity. At relatively high traverse frequencies, say greater than about 50 c.p.s., the product is an interlaced yarn. At intermediate traverse frequencies, say between about 25 c.p.s. and about 50 c.p.s., the product is an interlaced alternating-twist yarn (FIGURE 19). The last-mentioned product differs from interlaced yarn which is subsequently imparted an alternating twist in that the density of interlacing varies along the length of the yarn, tending to be most dense at the points of minimum twist, hereby enhancing the stability of the product. The effect is most pronounced when using the apparatus of FIGURE 10, where the product even at low traverse frequencies also is an alternating-twist yarn having interlaced twist reversal segments.

FIGURE 18 shows graphically the lengthwise variation in twist along the length of a segment of an alternating-twist yarn of this invention wherein ordinate oS indicates level of S twist and ordinate oZ indicates level of the Z twist at any point along the yarn length, i.e., the abscissa oL. At the initiation of twisting (at o), the S twist level rises rapidly to a maximum a, then, approaching equilibrium twisting, falls off towards b. Twisting is stopped or reversed at b, allowing the upstream accumulation of twist to pass downstream and onto the beam. Such practice results in Z twist rising to its maximum twist level at c, then, again approaching equilibrium twisting, falling off towards d, at which point twisting in the S direction is initiated, and the process commencing at o is repeated. By suitable variation of processing conditions, the curve of FIGURE 18 can be made to assume a variety of proportions which, of course, need not be symmetrical. Note that as the twist level rises from o, the yarn cross section approaches substantial circularity, whereas zero-twist yarn (at o) has a ribbon-like cross section. The curve of FIGURE 18 tends to "flatten" as the ratio decreases (see Equation 1). Referring to FIGURE 18, the twist period is the length of segment od; "increment length" of twist is the length of segments ob and bd; "maximum twist" is indicated at a or c, and "average twist" is given by dotted line o'L'.

FIGURES 11 and 12 show apparatus with which the fluid twister may be used. FIGURE 11 illustrates schematically a string-up assembly for twisting yard immediately after spinning and prior to packaging. Filaments 11 issue from spinneret 12, converge at guide 13 into yarn 14, and finish is optionally applied (means not shown) prior to passing the nip rolls 15, which serve as snubbing means and the feed point for fluid twister 16. After twisting, yarn 14 passes to the takeup point, backwindable package 18 driven by drive roll 17. FIGURE 12 illustrates schematically a string-up assembly whereby yarn is twisted immediately after drawing and prior to packaging. In accordance with this embodiment, undrawn yarn 14 is withdrawn from package 20, passes through pigtail guide 21, then is passed in multiple wraps about driven feed roll 22 and its associated separator roll 23. In a highly preferred embodiment, yarn is supplied directly to guide 21 from a spinning position (see FIGURE 11) rather than a package. From feed roll 22 the undrawn yarn makes one or more wraps about a snubbing pin 24 and is drawn in frictional contact therewith under the urging of draw roll 25 and its associated separator roll 26. Draw roll 25, of course, has a higher peripheral speed than feed roll 22, whence the yarn is elongated to several times its original length. From draw roll 25, which serves as the feed point, the yarn passes twister 16, is twisted as directed hereinabove, then to the package 18 driven by drive roll 17. In both FIGURES 11 and 12, the traverse means are made a part of the windup assembly 17—18; specifically, drive roll 17 is of the self-traversing variety (Calhoun et al., U.S. Patent Re. 23,977). Other traverse means are applicable, such as reciprocating guides located either up or downstream from fluid twister 16. Also, it is preferred that guide means or the like to be present to provide a pivot point for the yarn. In the FIGURES 11 and 12, such action is derived from the yarn advancing means, the nip rolls and draw roll, respectively. Regarding the location of the twister intermediate the feed point and takeup point, it has been shown that as the ratio of $L_u$ [see Equation 1] to $L_D$ (the downstream distance from the twister to the takeup point), $L_u/L_D$, increases the downstream twist level, as measured at the takeup point also increases with respect to the maximum obtainable upstream twist level. A high value of $L_u/L_D$ is achieved by positioning the twister near the takeup point. Of course, when the traverse is part of the windup, the twister should not be located so near the takeup point that the yarn is snubbed at the twister by the traverse. On the other hand, the twister should be located sufficiently close to the traverse means so that the yarn is displaced thereby from vortex to vortex within the twister.

The twist retentivity of the alternating-twist structure of the yarns of this invention is illustrated by electrically recorded graphs of FIGURES 14–17, in which twist retentivity is indicated by the amplitude of the wave forms.

The above-described fluid twisters are suitable for twisting a large variety of filamentary structures, including staple or continuous multifilament yarn, monofilaments, thread, fibers, roving strands, and the like. Yarn will be employed throughout the instant disclosure as exemplary of all such structures, since in the twisting of yarn the invention has its greatest utility. The yarn or the like structures may be composed either partially or entirely of synthetic polymeric materials, such as the polyamides (nylon), e.g., poly (E-caproamide) and poly-(hexamethylene adipamide); polyesters, e.g., poly(ethylene terephthalate); acrylic polymers, such as polyacrylonitrile and/or the many copolymers thereof; vinyl polymers, e.g., poly(vinyl chloride), poly(vinylidene chloride), or copolymers thereof; elastomers; hydrocarbon polymers, such as polyethylene or polypropylene; and so on. The composition may be based on naturally occurring materials, including the cellulose esters, regenerated cellulose (rayon), regenerated protein, cotton, wool, silk, glass, asbestos, etc. Yarns useful in this process include those having Y, cruciform, or otherwise modified cross sections, since such yarns twist at a high rate due to their irregular surface and increased surface area. This process is quite useful with elastomeric yarns, because of the very low operating tensions permitted during twisting. Yarn to be twisted may contain any of the usual textile additives, e.g., delusterants, antioxidants, etc., and may be "finished" in accordance with accepted practice. Although a quite wide range of yarn denier and filament count may be used, e.g., from monofilaments to a tow, when extremely large or small yarn bundles are twisted, twister dimensions should be adjusted according to the foregoing discussion.

By suitable determination of the traverse cycle frequency, the process of this invention may be practiced so as to produce an exceptionally uniform stable alternating-twist yarn, a stable alternating-twist yarn having interlaced twist reversal segments, or an interlaced yarn per se. In the absence of traversing and utilizing a pulsating fluid supply, the apparatus of this invention may be used to twist two or more yarn ends simultaneously, adjacent ends having their respective twist profiles completely out of phase with respect to one another. Numerous additional uses for the instant process and apparatus are discussed in the patent application filed August 12, 1958, referred to above.

The following examples illustrate preferred modes of practice of the present invention but, of course, are not all-inclusive.

EXAMPLE I

The "double vortex" fluid twister of FIGURE 2 is utilized to twist 75 denier 24 filament cellulose acetate yarn. The twister 50 has two 0.030" diameter yarn passageways 51a and 51b which are ¼" long and have their respective centers spaced 0.030" apart. The fluid conduits 52a and 52b are 0.022" in diameter; the fluid actually intersects the yarn passageways from .032" by .017" slot 53. The yarn string-up slot 57 is 0.004" wide. The yarn is forwarded from a spinning position (see FIGURE 11) to the twister located about intermediate the nip rolls and a traversing drive roll windup at 617 yards per minute (y.p.m.); 10 grams tension, and is traversed at ca. 15 cycles per second (c.p.s.). The alternating twist average level in turns per inch (t.p.i.) and period at various air pressures is indicated in Table IA

*Table IA*

| Run | Air Pressure, p.s.i.g. | Average Twist, t.p.i. | Period, Inches |
|---|---|---|---|
| 1 | 10 | 1 | 23 |
| 2 | 20 | 2 | 20 |
| 3 | 30 | 2.3 | 23 |
| 4 | 40 | 2.5 | 23 |
| 5 | 50 | 2.5 | 23 |

These results show that with increasing air (fluid) pressure, the alternating-twist level increases and the period length remains about the same. With an increase in traverse cycle frequency, the period length decreases. With an increase in tension, the average twist level decreases. The product in all cases is exceptionally uniform. Table IB shows results obtained with the above conditions of run 2 by varying the traverse cycle frequency.

Table IB

| Run | Traverse Frequency, c.p.s. | Average Twist, t.p.i. | Period, inches |
|---|---|---|---|
| 6 | 5 | 1.5 | 74 |
| 7 | 10 | 2 | 37 |
| 8 (2) | 15 | 2 | 23 |
| 9 | 20 | 2 | 19 |
| 10 | 25 | 1.5 | 15 |

The results in Table IB show that as the traverse cycle frequency increases, the twist period decreases.

The above apparatus is used in combination with auxiliary means to provide higher speed traversing but with conventional windup assemblies, thereby retaining quality of package formation at a high level. A vibrating reed is employed. The following Table IC shows the preparation of the numerous products prepared by this method. Air pressure, tension, and yarn (75/24 cellulose acetate) speed are uniform throughout the series, 25 p.s.i.g., 12 grams, and 617 y.p.m., respectively.

Table IC

| Run | Traverse Cycle Frequency, c.p.s. | Average Twist, t.p.i. | Period, Inches | Product |
|---|---|---|---|---|
| 11 | 15 | 2 | 25 | alternating-twist yarn. |
| 12 | 25 | 1.3 | 15 | Do. |
| 13 | 30 | 1 | 13 | alternating-twist yarn, interlaced reversal segments. |
| 14 | 35 | 0.7 | 11 | Do. |
| 15 | 40 | 0.4 | 9 | interlaced alternating-twist yarn. |
| 16 | 45 | 0.2 | 8 | Do. |

It is apparent from the foregoing that as the traverse frequency increases, the product assumes increased interlaced character. At higher frequencies, an interlaced yarn per se is produced. The alternating-twist product having interlaced twist reversal segments is readily prepared at lower traverse frequencies by either twister-interlacer of FIGURE 10, or without traversing by using the twister-interlacer of FIGURE 9.

Finally, the above twister (FIGURE 2) is used in combination with a vibrating reed to traverse the yarn at high frequencies. A plied yarn consisting of an end each of white 70/34 poly(ethylene terephthalate) and red 75/24 cellulose acetate is used. The yarns are fed at 500 y.p.m., each under 10 grams tension, using air at 80–100 p.s.i.g. pressure. When the reed is vibrated at a frequency of 50 c.p.s., the interlace density is judged "medium." Where the reed is vibrated at 75 c.p.s., the interlace density is determined as "heavy." In both cases, the plying is relatively thorough, the product appearing a uniform pink color to the observer. This method is particularly useful for interlacing per se, and for plying yarns. Other methods are equally suited for providing exceedingly high speed reciprocation of the yarn line.

EXAMPLE II

The twister of Example I is used to twist 34 filament 70 denier poly(hexamethylene adipamide) yarn after drawing (see FIGURE 12). The yarn speed is 2150 y.p.m., the tension is 15 grams, and the traverse cycle frequency is 18 c.p.s. The results at various air pressures are given in Table IIA.

Table IIA

| Run | Air Pressure, p.s.i.g. | Average Twist, t.p.i. | Period, Inches |
|---|---|---|---|
| 17 | 20 | 1 | 72 |
| 18 | 30 | 1.5 | 72 |
| 19 | 40 | 2 | 72 |
| 20 | 60 | 2.2 | 72 |
| 21 | 80 | 2.3 | 72 |

Here the product is a uniform alternating-twist yarn. At increased fluid pressure, the alternating-twist level increases. At increased traverse cycle frequency, interlacing appears in the product.

Test yarns from the above runs are inspected electronically by a device which plots twist retentivity profiles. FIGURES 14–17 show such graphs, in which twist retentivity is indicated by the amplitude of the wave forms at 0, 10, 20, and 30 grams tension, respectively. Similarly, graphs prepared on the basis of electronically inspected alternate twist yarns of this invention and alternate twist yarns prepared by a rotary valve fluid twister which twists yarn alternately in opposite directions (see U.S. application Serial No. 754,912 filed August 12, 1958, by Breen and Sussman) show the improved and unusual uniformity of the products of this invention.

In order to enhance the alternating twist in the yarns prepared according to the foregoing, the yarn may be twisted in a semi-plastic state, such as that which derives from heating the yarn, by treatment with chemical plasticizers, or, in the case of wet or dry-spinning, merely by twisting yarns which contain relatively large amounts of residual spinning solvent. By way of such measures, higher levels in twist are obtained, owing in part to a reduction in torsional modulus of the yarn accompanying such plasticization. Moreover, during and subsequent to such treatment, the twist in the product is effectively "set," due to rapid cooling, solvent removal, etc., in the twisting step. Alternating twist also is rendered more retentive by interlacing over the segments of twist reversal, an operation which "locks in" twist. The twist in such a yarn may later be removed or made "lively" by tensioning the yarn, provided that sufficiently high tensions are used. Thus, by preparing an alternating-twist yarn with interlaced reversals (FIGURE 19), the advantages of both types of yarn are achieved in a single structure, i.e., a yarn having the elasticity or twist liveliness of a stable alternating-twist yarn, and the retentivity of structure characteristic of an interlaced yarn. Of course, all of the yarns prepared in accordance with this invention possess random filament twist, as is characteristic of pneumatic twisting.

In addition to the many advantages inherent in pneumatic twisting in general, the instant process and apparatus makes possible the production of a variety of products with essentially the same apparatus while utilizing a continuous supply of fluid. Alternating-twist yarns having sharp reversals and exceptional uniformity of twist profile, with or without interlacing of reversals, are prepared rapidly and continuously. The variety of apparatus utilizing the "multiple vortex" principle permits single or multi-end operations under a wide variety of conditions of yarn speed, traverse cycle frequency, etc. Fabrics prepared from yarns prepared in accordance herewith are characteristically more uniform. Numerous other advantages attending the practice of this invention will occur readily to those undertaking its practice.

As an alternative to traversing the yarn in carrying out the process of this invention, the yarn path may be maintained substantially constant and the multiple vortex jet apparatus traversed in order that the yarn may pass alternately through each of the vortices.

We claim:

1. A process for producing an alternate twist yarn comprising directing each of at least two jets of fluid in succession against successive segments of a running yarn, a first jet twisting the yarn in one direction and a second jet, acting in succession to the first jet, twisting an adjacent segment of the yarn in an opposite direction, the yarn being maintained under a controlled tension during the twisting.

2. The process of claim 1 in which the yarn is placed alternately under the direct influence of one jet and then another by varying the path of the yarn.

3. A process for producing an alternate twist yarn comprising directing each of at least two jets of fluid in succession against successive segments of a running yarn, a first jet momentarily separating the filaments in the yarn and simultaneously twisting the yarn bundle in one direction, and an adjacent second jet acting in succession to the first jet, twisting an adjacent segment of the yarn in an opposite direction, the yarn being maintained under a controlled tension during the twisting.

4. A process for producing an alternate twist yarn comprising passing a running yarn alternately through adjacent fluid vortices, each substantially parallel to the longitudinal axis of the running yarn, and revolving in opposite directions, to twist successive adjacent segments of the yarn in opposite directions, the running yarn being maintained under a controlled tension during the twisting less than the tension necessary to remove the twist imparted to the yarn.

5. The process of claim 4 in which the fluid is air.

6. The process of claim 4 in which the fluid is steam.

7. The process of claim 4 in which the yarn is a continuous filament yarn.

8. The process of claim 4 in which the yarn is a staple fiber yarn.

9. The process of claim 4 in which the yarn contains both staple fibers and continuous filaments.

10. The process of claim 4 in which the yarn consists of synthetic filaments.

11. The process of claim 4 in which an average absolute twist of at least 0.5 turn per inch is imparted to the yarn.

12. The process of claim 4 in which the yarn alternation between the vortices is varied at a rate of less than about 50 cycles per second.

13. The process of claim 12 in which the yarn alternation between the vortices is varied at a rate of less than about 25 cycles per second.

14. The process of claim 4 in which the vortices partially intersect with each other and the running yarn is maintained in the intersection during a sufficient portion of each cycle of alternation of the yarn between the vortices to produce a modified alternate twist yarn in which alternating twist segments are separated by segments of yarn having zero bundle twist but in which individual filaments or groups of filaments are interlaced.

15. An apparatus for twisting yarn comprising at least two substantially parallel yarn passageways in the form of smooth curved concave surfaces, said passageways communicating through a common wall, at least one fluid conduit positioned to direct fluid in opposed directions about the inner periphery of each of the passageways so that the direction of fluid in one passageway will be opposite to that in another passageway, means for moving yarn through the passageways at controlled low tension, and means for traversing a yarn from one yarn passageway to another.

16. The apparatus of claim 15 having two yarn passageways, each having a semi-circular cross-section and a diameter common to both.

References Cited in the file of this patent

UNITED STATES PATENTS

| | | |
|---|---|---|
| 2,761,272 | Vandamme et al. | Sept. 4, 1956 |
| 2,783,609 | Breen | Mar. 5, 1957 |
| 2,823,514 | Vandamme et al. | Feb. 18, 1958 |
| 2,846,839 | Billion | Aug. 12, 1958 |

FOREIGN PATENTS

| | | |
|---|---|---|
| 355,447 | Great Britain | Aug. 27, 1931 |